United States Patent
Meshram et al.

(10) Patent No.: US 12,536,155 B1
(45) Date of Patent: Jan. 27, 2026

(54) METHOD AND SYSTEM FOR OPERATING LOW LATENCY DATA STORE

(71) Applicant: JPMorgan Chase Bank, N.A., New York, NY (US)

(72) Inventors: Amit Kumar Meshram, Romansville, PA (US); Rowen Holt, Hoboken, NJ (US); Lori-Ann Newnam, Thornton, PA (US); Anirudh Gupta, Dunn Loring, VA (US); Ilya Medvinskiy, New York, NY (US); Dan Bodalski, Swedesboro, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/886,727

(22) Filed: Sep. 16, 2024

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 11,443,376 | B2 * | 9/2022 | Sankaran | H04L 5/0032 |
| 2008/0301124 | A1 * | 12/2008 | Alves | G06F 16/2453 707/999.005 |
| 2021/0263735 | A1 * | 8/2021 | Harishankar | G06F 8/31 |

OTHER PUBLICATIONS

Samsung Electronics, Co. Ltd., "Samsung Z-SSD and ScyllaDB: Delivering Low Latency and Mult-Terabyte Capacity in a Persistent Database", Samsung White Paper, 2018, 10 pages. (Year: 2018).*
Abbott, Marty, "CQRS Pattern—Command Query Responsibility Segregation", blog post published Jun. 24, 2019, 9 pages. (Year: 2019).*
Sylladb, Inc., "ScyllaDB: The Best of Cassandra, Without the Java Overhead", ScyllaDB White Paper, 2021, 6 pages. (Year: 2021).*

* cited by examiner

*Primary Examiner* — Scott A. Waldron
(74) *Attorney, Agent, or Firm* — GREENBLUM & BERNSTEIN, P.L.C.

(57) ABSTRACT

Various methods and processes, apparatuses or systems, and media for operating a low latency data store that is designed to provide rapid accessibility to data while ensuring data integrity, consistency, and reliability are disclosed. The method includes: receiving a set of data; storing the set of data in a storage medium; receiving, from a user, a query that relates to the set of data; and providing a subset of the set of data to the user in response to the query. The storage medium includes a non-relational database that implements a Command Query Responsibility Segregation (CQRS) architecture within which a command part performs write operations and a query part performs read operations. The query part is horizontally scaled such that the provision of the subset of the set of data is performable within less than one second of the receiving of the query.

20 Claims, 4 Drawing Sheets

METHOD AND SYSTEM FOR OPERATING LOW LATENCY DATA STORE

TECHNICAL FIELD

This disclosure relates to methods and apparatuses for operating a low latency data store that is designed to provide rapid accessibility to data while ensuring data integrity, consistency, and reliability.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Conventional systems of records, predominantly mainframe-based systems of records, were initially designed to ensure reliability of command traffic. Data was ingested into data warehouses representing the primary destinations for most queries. With the emergence of real time traffic through digital experiences, systems of records (SORs) began exposing their data to queries via application programming interfaces (APIs). Over time, the volume of query traffic has grown significantly, often surpassing command traffic. In more recent times, it has become relatively common for queries to constitute up to ninety percent (90%) of total SOR millions of instructions per second (MIPS). These strategic shifts have had profound effects on the cost, scalability, and reliability of SORs, often contributing to operational issues.

Accordingly, there is a need for a mechanism for operating a low latency data store that is designed to provide rapid accessibility to data while ensuring data integrity, consistency, and reliability.

SUMMARY

The present disclosure, through one or more of its various aspects, embodiments, and/or specific features or sub-components, provides, among other features, various systems, servers, devices, methods, media, programs, and platforms for operating a low latency data store that is designed to provide rapid accessibility to data while ensuring data integrity, consistency, and reliability.

According to an aspect of the present disclosure, a method for providing rapid accessibility to data is provided. The method may be implemented by at least one processor. The method includes: receiving a first set of data; storing the first set of data in a storage medium; receiving, from a user, a first query that relates to the first set of data; and providing, to the user in response to the first query, a subset of the first set of data. The storage medium includes a non-relational database that implements a Command Query Responsibility Segregation (CQRS) architecture within which a command part is configured to perform write operations and a query part is configured to perform read operations. The query part is horizontally scaled such that the providing of the subset of the first set of data is performable within less than one second of the receiving of the first query.

When the first query is received via an application programming interface (API), the providing of the subset of the first set of data may be performable via the API within less than 100 milliseconds of the receiving of the first query.

The storage medium may be configured to receive at least two hundred million API calls per day.

The storage medium may be configured to store at least twenty billion records per day.

The processor may be configured to conduct at least fifty million transactions per day.

The storage medium may have an availability of at least 99.99%, such that an unavailability of the storage medium is less than one hour per year.

The method may further include implementing a data reconciliation framework configured to track event count mismatches and to perform a rehydration process to remedy the event count mismatches.

The method may further include: receiving, from a second user, a command that relates to writing a second set of data to the storage medium; and storing the second set of data in the storage medium.

The method may further include receiving a request that relates to identifying a source of a particular set of data, and generating, in response to the request, an audit trail report that includes an identification of the source of the particular set of data.

The method may further include implementing a store-and-forward function to facilitate an event replay that occurs in response to a temporary system failure.

According to another embodiment, a computing apparatus for providing rapid accessibility to data is provided. The computing apparatus includes a processor; a memory; and a communication interface coupled to each of the processor and the memory. The processor is configured to: receive, via the communication interface, a first set of data; store the first set of data in the memory; receive, from a user via the communication interface, a first query that relates to the first set of data; and provide, to the user in response to the first query, a subset of the first set of data. The memory includes a non-relational database that implements a Command Query Responsibility Segregation (CQRS) architecture within which a command part is configured to perform write operations and a query part is configured to perform read operations. The query part is horizontally scaled such that the provision of the subset of the first set of data is performable within less than one second of the reception of the first query.

When the first query is received via an application programming interface (API), the processor may be further configured to perform the provision of the subset of the first set of data via the API within less than 100 milliseconds of the reception of the first query.

The memory may be configured to receive at least two hundred million API calls per day.

The memory may be configured to store at least twenty billion records per day.

The processor may be further configured to conduct at least fifty million transactions per day.

The memory may have an availability of at least 99.99%, such that an unavailability of the memory is less than one hour per year.

The processor may be further configured to implement a data reconciliation framework configured to track event count mismatches and to perform a rehydration process to remedy the event count mismatches.

The processor may be further configured to: receive, from a second user via the communication interface, a command that relates to writing a second set of data to the memory; and storing the second set of data in the memory.

According to yet another embodiment, a non-transitory computer readable storage medium storing instructions for providing rapid accessibility to data is provided. The storage medium includes a set of executable code which, when executed by a processor, causes the processor to: receive a first set of data; store the first set of data in a memory; receive, from a user, a first query that relates to the first set of data; and provide, to the user in response to the first query, a subset of the first set of data. The memory includes a non-relational database that implements a Command Query Responsibility Segregation (CQRS) architecture within which a command part is configured to perform write operations and a query part is configured to perform read operations. The query part is horizontally scaled such that the provision of the subset of the first set of data is performable within less than one second of the reception of the first query.

Wherein when the first query is received via an application programming interface (API), the provision of the subset of the first set of data may be performable via the API within less than 100 milliseconds of the reception of the first query.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
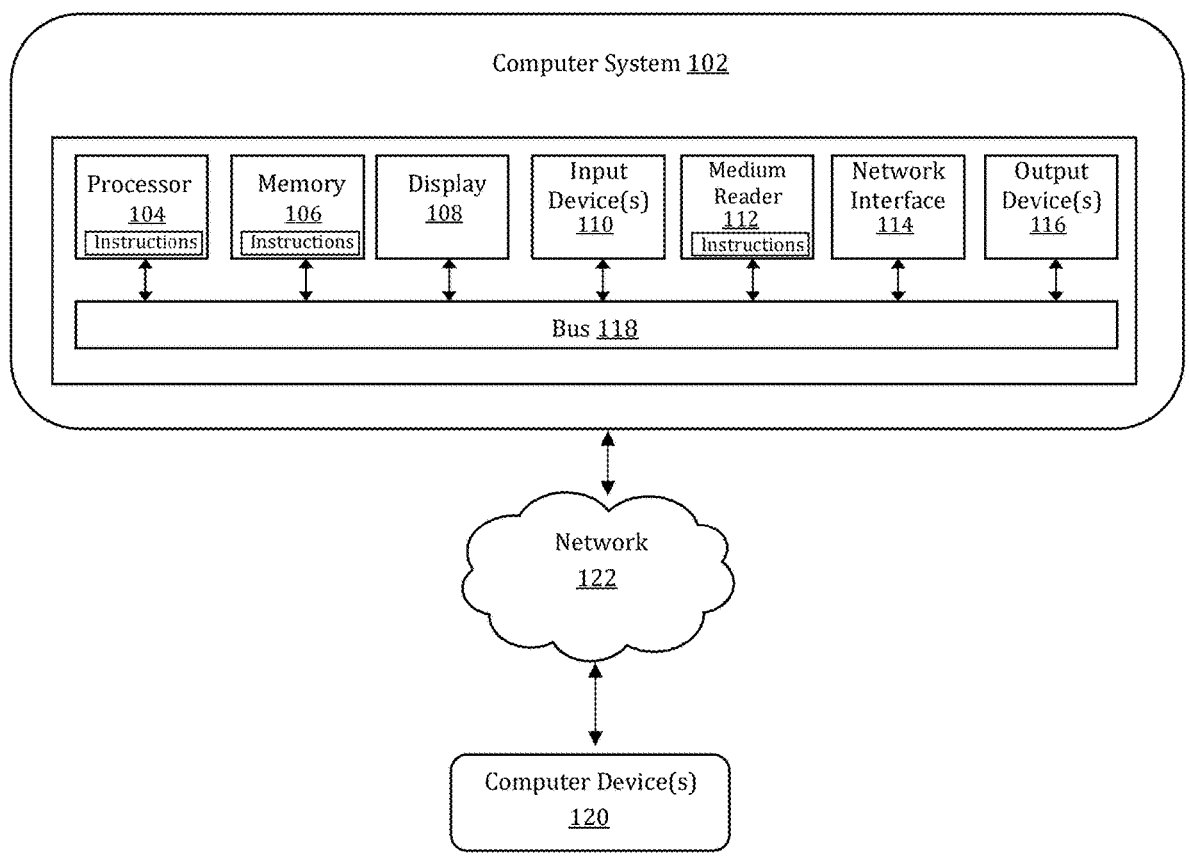
FIG. 1 illustrates a computer system for implementing a method for operating a low latency data store that is designed to provide rapid accessibility to data while ensuring data integrity, consistency, and reliability, in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is a system 100 for use in implementing a method for operating a low latency data store that is designed to provide rapid accessibility to data while ensuring data integrity, consistency, and reliability, in accordance with an embodiment. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the modules implemented by the system 100 may be platform, language, database, and cloud agnostic that may allow for consistent easy orchestration and passing of data through various components to output a desired result regardless of platform, browser, language, database, and cloud environment by writing programs accordingly. The configuration or data files, in some embodiments, may be written using JavaScript Object Notation (JSON), but the disclosure is not limited thereto. For example, the configuration or data files may easily be extended to other readable file formats such as Extensible Markup Language (XML), YAML Ain't Markup Language (YAML), etc., or any other configuration-based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing may be constructed to implement one or more of the methods or functionality as described herein, and a processor described herein may be used to support a virtual processing environment.

Figure 2:
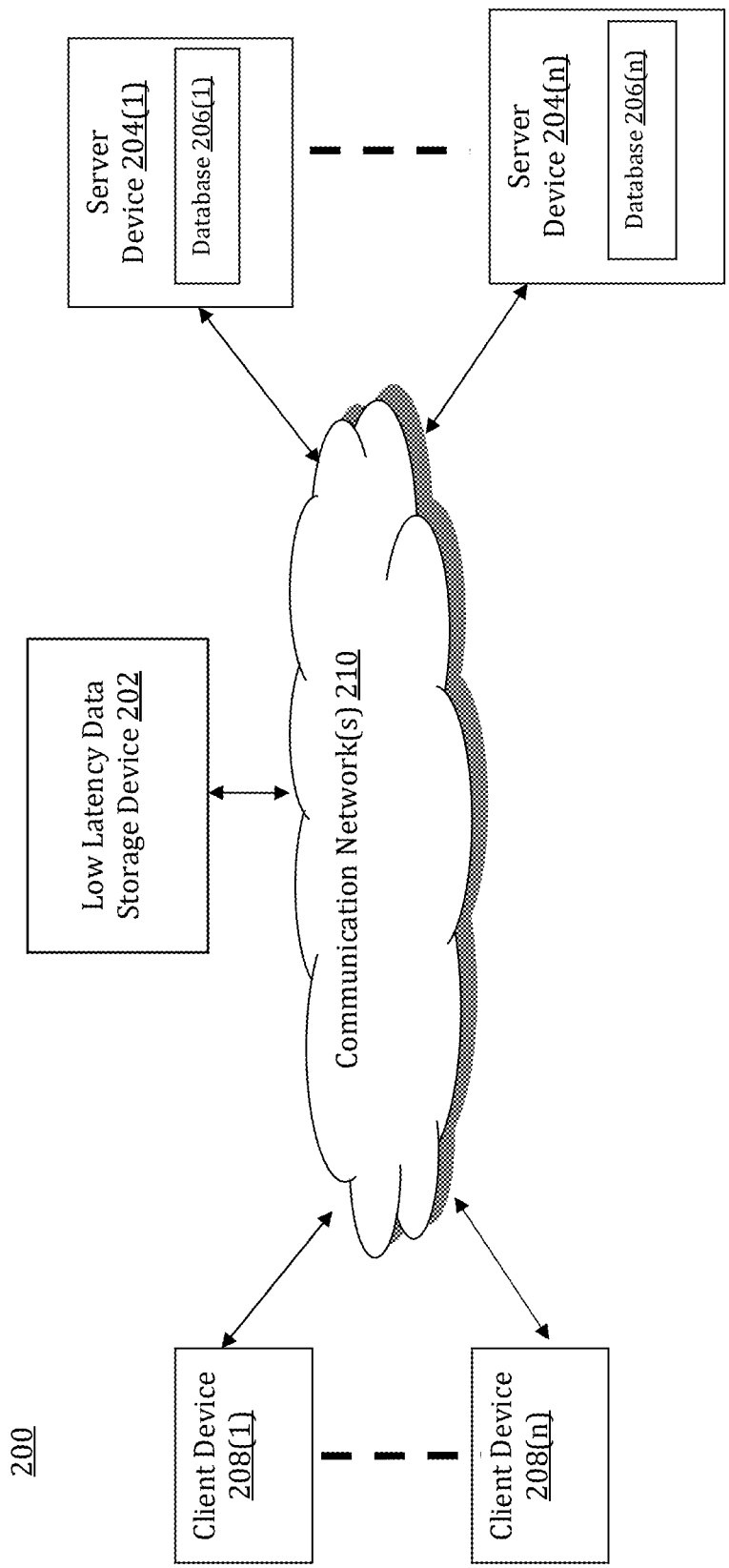
FIG. 2 illustrates an exemplary diagram of a network environment with a device for operating a low latency data store that is designed to provide rapid accessibility to data while ensuring data integrity, consistency, and reliability, in accordance with an embodiment.

Referring to FIG. 2, a schematic of a network environment 200 for implementing a low latency data storage device (LLDSD) of the instant disclosure is illustrated.

In some embodiments, the above-described problems associated with conventional tools may be overcome by implementing an LLDSD 202 as illustrated in FIG. 2 that may be configured for implementing a method for operating a low latency data store that is designed to provide rapid accessibility to data while ensuring data integrity, consistency, and reliability, but the disclosure is not limited thereto.

The LLDSD 202 may have one or more computer system 102s, as described with respect to FIG. 1, which in aggregate provide the necessary functions.

The LLDSD 202 may store one or more applications that can include executable instructions that, when executed by the LLDSD 202, cause the LLDSD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LLDSD 202 itself, may be located in virtual server(s) running in a cloud-based computing environment rather than being tied to one or more specific physical network computing devices.

Also, the application(s) may be running in one or more virtual machines (VMs) executing on the LLDSD 202. Additionally, in one or more embodiments of this technology, virtual machine(s) running on the LLDSD 202 may be managed or supervised by a hypervisor.

In the network environment 200 of FIG. 2, the LLDSD 202 is coupled to a plurality of server devices 204(1)-204(n) that hosts a plurality of databases 206(1)-206(n), and also to a plurality of client devices 208(1)-208(n) via communication network(s) 210. A communication interface of the LLDSD 202, such as the network interface 114 of the computer system 102 of FIG. 1, operatively couples and communicates between the LLDSD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LLDSD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LLDSD 202 may be a standalone device or integrated with one or more other devices or apparatuses, such as one or more of the server devices 204(1)-204(n), for example. In one particular example, the LLDSD 202 may be hosted by one of the server devices 204(1)-204(n), and other arrangements are also possible. Moreover, one or more of the devices of the LLDSD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LLDSD 202 via the communication network(s) 210 according to the HyperText Transfer Protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store various types of data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

In some embodiments, the client devices 208(1)-208(n) in this example may include any type of computing device that can facilitate the implementation of the LLDSD 202 that may efficiently provide a platform for implementing a method for operating a low latency data store that is designed to provide rapid accessibility to data while ensuring data integrity, consistency, and reliability, but the disclosure is not limited thereto.

The client devices 208(1)-208(n) may run interface applications, such as standard web browsers or standalone client applications, which may provide an interface to communicate with the LLDSD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the LLDSD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the LLDSD 202, the server devices 204(1)-204(n), or the client devices 208(1)-208(n), for example, may be configured to operate as virtual instances on the same physical machine. For example, one or more of the LLDSD 202, the server devices 204(1)-204(n), or the client devices 208(1)-208(n) may operate on the same physical device rather than as separate devices communicating through communication network(s) 210. Additionally, there may be more or fewer LLDSDs 202, server devices 204(1)-204(n), or client devices 208(1)-208(n) than illustrated in FIG. 2. In some embodiments, the LLDSD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
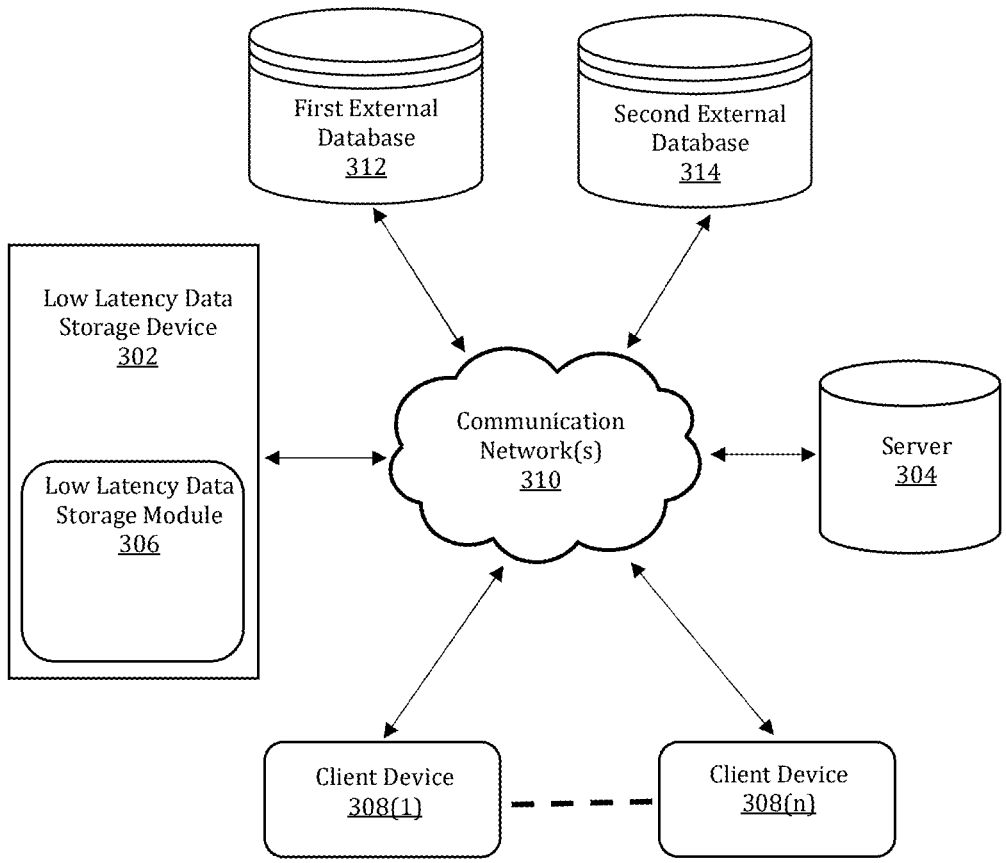
FIG. 3 illustrates a system diagram for implementing a method for operating a low latency data store that is designed to provide rapid accessibility to data while ensuring data integrity, consistency, and reliability, in accordance with an embodiment.

FIG. 3 illustrates a system diagram for implementing an LLDSD 302 having a low latency data storage module (LLDSM), in accordance with an embodiment.

As illustrated in FIG. 3, the system 300 may include an LLDSD 302 within which an LLDSM 306 is embedded, a server 304, a first external database 312, a second external database 314, a plurality of client devices 308(1) . . . 308(n), and a communication network 310.

In some embodiments, the LLDSD 302 including the LLDSM 306 may be connected to the server 304, and the database(s) 312 via the communication network 310. The LLDSD 302 may also be connected to the plurality of client devices 308(1) . . . 308(n) via the communication network 310, but the disclosure is not limited thereto.

In an embodiment, the LLDSD 302 is described and shown in FIG. 3 as including the LLDSM 306, although it may include other rules, policies, modules, databases, or applications, for example. In some embodiments, the first external database 312 and/or the second external database 314 may be configured to store ready to use modules written for each application programming interface (API) for all environments. Although only one database is illustrated in FIG. 3, the disclosure is not limited thereto. Any number of desired databases may be utilized for use in the disclosed invention herein. The databases 312, 314 may be a mainframe database, a log database that may produce programming for searching, monitoring, and analyzing machine-generated data via a web interface, etc., but the disclosure is not limited thereto.

In some embodiments, the LLDSM 306 may be configured to receive real-time feed of data from the plurality of client devices 308(1) . . . 308(n) and secondary sources via the communication network 310.

As may be described below, the LLDSM 306 may be configured to: receive a first set of data; store the first set of data in a first storage medium; receive, from a user, a first query that relates to the first set of data; and provide, to the user in response to the first query, a subset of the first set of data, either within less than one second of the receiving of the first query, or, when the first query is received via an API, within less than 100 milliseconds of the receiving of the first query, but the disclosure is not limited thereto.

The plurality of client devices 308(1) . . . 308(n) are illustrated as being in communication with the LLDSD 302. In this regard, the plurality of client devices 308(1) . . . 308(n) may be "clients" (e.g., customers) of the LLDSD 302 and are described herein as such. Nevertheless, it is to be known and understood that the plurality of client devices 308(1) . . . 308(n) need not necessarily be "clients" of the LLDSD 302, or any entity described in association therewith herein. Any additional or alternative relationship may exist between either or both of the plurality of client devices 308(1) . . . 308(n) and the LLDSD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(n) may communicate with the LLDSD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The LLDSD 302 may be the same or similar to the LLDSD 202 as described with respect to FIG. 2, including any features or combination of features described with respect thereto.

Figure 4:
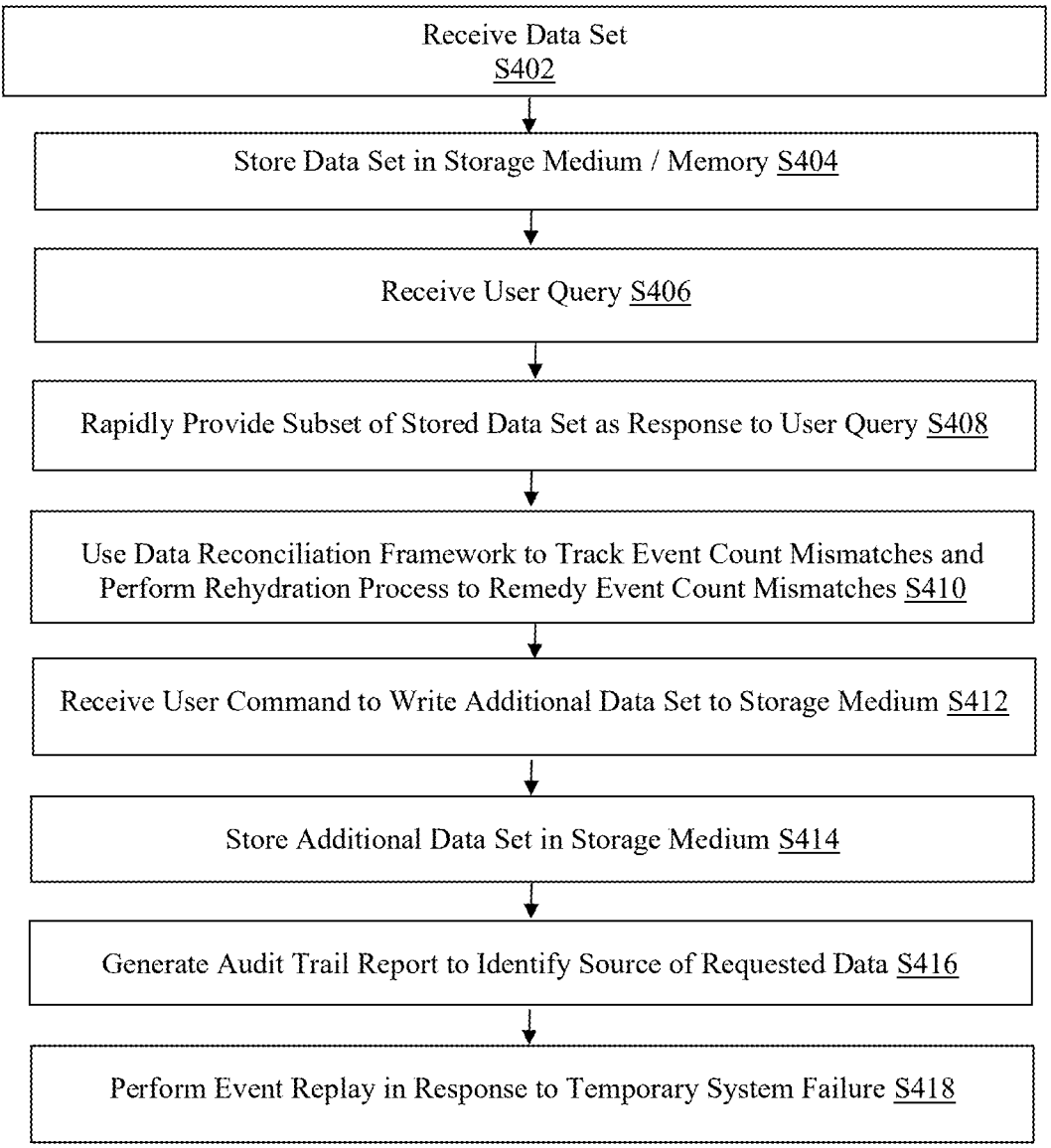
FIG. 4 illustrates an exemplary flow chart of a process for operating a low latency data store that is designed to provide rapid accessibility to data while ensuring data integrity, consistency, and reliability, in accordance with an embodiment.

FIG. 4 illustrates a flow chart of a process 400 implemented by the LLDSM 306 of FIG. 3 for enablement of a system and a method for operating a low latency data store that is designed to provide rapid accessibility to data while ensuring data integrity, consistency, and reliability, in accordance with an embodiment. It may be appreciated that the illustrated process 400 and associated steps may be performed in a different order, with illustrated steps omitted, with additional steps added, or with a combination of reordered, combined, omitted, or additional steps.

As illustrated in FIG. 4, at step S402, the process 400 may include receiving a first data set that is intended to be stored in a large data repository. In an embodiment, the first data set may be stored together with other data sets; alternatively, the first data set may be stored without other data sets. In an embodiment, the reception of the first data set may be performed in accordance with a default data ingestion processing capacity, but whenever a sudden burst of incoming data occurs, the LLDSM 306 may dynamically adjust the data ingestion processing capacity based on throughput capacity and lag.

At step S404, the process 400 may include storing the first data set in a storage medium, such as a memory or a database. In an embodiment, the storage medium may include a non-relational database that implements a Command Query Responsibility Segregation (CQRS) architecture within which a command part is configured to perform write operations and a query part is configured to perform read operations. For example, the storage medium may include a NoSQL database that is designed to handle very large volumes of data and input/output operations. Further, the query part may be horizontally scaled in order to maximize a capability of handling high read loads. In an embodiment, the horizontal scaling of the query part may be implemented by dynamically partitioning the storage medium so that each partition has a maximum capacity, such as, for example, 10 megabytes. In this manner, searching for information within the storage medium is faster because the amount of information in each partition is limited. In an embodiment, a default partition may include 24 partitions that correspond to 24 months of historical data, but the number of partitions may vary based on the total amount of data being stored and the maximum capacity of each partition.

In an embodiment, the query part may be configured to dynamically scale the reading of the data based on three metrics, i.e., central processing unit (CPU) capacity, memory utilization, and throughput. For example, the LLDSM 306 may be handling approximately 6000 transactions per second at a particular time, but then the volume may increase to approximately 12,000 transactions for second, and in this scenario, the reading of the data may be automatically adjusted to account for the increased volume.

In an embodiment, the storage medium may be configured to store a large number of records on a regular basis, such as, for example, at least twenty billion (i.e., 20,000,000,000) records per day. For example, the storage medium may be configured to handle a storage requirement of between ten billion and twenty-five billion records per day. In an embodiment, the storage medium may also be configured to receive at least 200 million API calls per day, and the storage medium may also have an availability of at least 99.99%, such that an unavailability of the storage medium is less than one hour per year. For example, the storage medium may be configured to handle an API call requirement of between 100 million and 250 million API calls per day. In addition, the storage medium may be configured to handle an availability requirement by which the storage medium is unavailable for between zero minutes and two hours per year.

At step S406, the process 400 may include receiving a user query that relates to the first data set. In an embodiment, the user query may include an inquiry that relates to a customer account, such as, for example, an inquiry about any one or more of an account balance, recent deposits and/or account credits, recent withdrawals and/or account debits, recent transactions, transaction history, and/or information that relates to the user, such as name, address, and account criteria such as a credit limit, overdraft protection information, and/or any other suitable type of information that that is associated with a customer account. In an embodiment, the user query may include any query; a degree to which the user query relates to the first data set is correlated with an ability to obtain a response that includes useful information. As such, when the user query is relatively closely related to the first data set, there is a relatively high likelihood that the response to the user query will include information that satisfies the user.

Then, at step S408, the process may include providing a subset of the first data set to the user as a response to the user query. In an embodiment, when the storage medium includes a non-relational database that implements a CQRS architecture within which the query part is horizontally scaled in order to maximize a capability of handling high read loads, the provision of the subset of the first data set may be performable within less than one second of the reception of the user query. In another embodiment, when the user query is received via an API, the provision of the subset of the first data set may be performable within less than 100 milliseconds of the reception of the user query. In an embodiment, the processor may be configured to conduct at least 50 million transactions per day. In this aspect, the process 400 manifests a low latency and a rapidity of user access to the stored data in responding to such a user query. In an embodiment, the LLDSM 306 uses metadata that accompanies the user query to determine which partition of the storage medium is the best partition for obtaining the response to the user query. In an embodiment, in a relatively rare circumstance in which the data required for providing a complete response to the user query is either lacking or delayed, whichever responsive data that is available may be provided, together with an as-of date indicator, in order to provide the user with at least a partial response to the user query, instead of providing no response to the user query.

At step S410, the process 400 may include implementing a data reconciliation framework that is configured to track event count mismatches and to perform a rehydration process to remedy the event count mismatches. In an embodiment, the rehydration process may include examining each event count mismatch to determine a cause for the respective mismatch, and then using the determined cause to correct any resulting errors in order to effectively eliminate the respective mismatch. For example, when the LLDSM 306 expects to see 9,000 records within a particular time interval but only 8,990 records are available, the rehydration process may be executed in order to capture the missing data. Further, the data reconciliation framework also continuously monitors the accuracy of the data to identify anomalies and to correct any inaccurate data points. In this aspect, the process 400 manifests data integrity, consistency, and reliability by remedying errors as they occur.

At step S412, the process 400 may include receiving, from a different user, a command to write an additional data set to the storage medium. Then, at step S414, the process 400 may include storing the additional data set in the storage medium in response to the command. In this aspect, the process 400 manifests an ability of any user to store newly generated data so that the newly generated data is available for providing accurate responses to subsequent queries. In an embodiment, when the storage medium includes a NoSQL database that is designed to handle very large volumes of data and input/output operations, the storage medium may be configured to receive many write commands for many additional data sets on a daily basis, such that a storage requirement of between ten billion and twenty-five billion records per day may be satisfied.

At step S416, the process 400 may include receiving a request that relates to identifying a source of a particular set of data, and then generating, in response to the request, an audit trail report that includes an identification of the source of that particular set of data. In an embodiment, the audit trail report may be generated by examining the particular set of data and a history of how and when the particular set of data was received, and then using a result of such an examination to determine the corresponding source. In this aspect, the process 400 manifests data integrity, consistency, and reliability by informing users about the sources of the data that is relied upon for responding to queries.

At step S418, the process may include implementing a store-and-forward function to facilitate an event replay that occurs in response to a temporary system failure. In an embodiment, the store-and-forward function may include a first step of detecting a system failure, a second step of storing a current version of the LLDSD 302 and the LLDSM 306, a third step of determining whether the system failure has been remedied, and a fourth step of replaying an event that is associated with the system failure in order to obtain a corrected result. In this aspect, the process 400 manifests a resiliency to provide responses to user queries even when a temporary system failure blocks an attempt to do so.

In some embodiments as disclosed above in FIGS. 1-4, technical improvements effected by the instant disclosure may include a platform for implementing a low latency data storage module configured for enablement of operating a low latency data store that is designed to provide rapid accessibility to data while ensuring data integrity, consistency, and reliability, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium may be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing rapid accessibility to data, the method being implemented by at least one processor, the method comprising:
   receiving a first set of data;
   storing the first set of data in a storage medium;
   receiving, from a user, a first query that relates to the first set of data; and
   providing, to the user in response to the first query, a subset of the first set of data,
   wherein the storage medium includes a non-relational database that implements a Command Query Responsibility Segregation (CQRS) architecture within which a command part is configured to perform write operations and a query part is configured to perform read operations, and
   wherein the query part is horizontally scaled such that the providing is performable within less than one second of the receiving of the first query.

2. The method of claim 1, wherein when the first query is received via an application programming interface (API), the providing is performable via the API within less than 100 milliseconds of the receiving of the first query.

3. The method of claim 2, wherein the storage medium is configured to receive at least two hundred million API calls per day.

4. The method of claim 1, wherein the storage medium is configured to store at least twenty billion records per day.

5. The method of claim 1, wherein the processor is configured to conduct at least fifty million transactions per day.

6. The method of claim 1, wherein the storage medium has an availability of at least 99.99%, such that an unavailability of the storage medium is less than one hour per year.

7. The method of claim 1, further comprising implementing a data reconciliation framework configured to track event count mismatches and to perform a rehydration process to remedy the event count mismatches.

8. The method of claim 1, further comprising receiving a request that relates to identifying a source of a particular set of data, and generating, in response to the request, an audit trail report that includes an identification of the source of the particular set of data.

9. The method of claim 1, wherein the query part is horizontally scaled by dynamically partitioning the storage medium so that each partition has a maximum capacity.

10. A computing apparatus for providing rapid accessibility to data, the computing apparatus comprising:
    a processor;
    a memory; and
    a communication interface coupled to each of the processor and the memory,
    wherein the processor is configured to:
       receive, via the communication interface, a first set of data;
       store the first set of data in the memory;
       receive, from a user via the communication interface, a first query that relates to the first set of data; and
       provide, to the user in response to the first query, a subset of the first set of data,
    wherein the memory includes a non-relational database that implements a Command Query Responsibility Segregation (CQRS) architecture within which a command part is configured to perform write operations and a query part is configured to perform read operations, and
    wherein the query part is horizontally scaled such that the provision of the subset of the first set of data is performable within less than one second of the reception of the first query.

11. The computing apparatus of claim 10, wherein when the first query is received via an application programming interface (API), the processor is further configured to perform the provision of the subset of the first set of data via the API within less than 100 milliseconds of the reception of the first query.

12. The computing apparatus of claim 11, wherein the memory is configured to receive at least two hundred million API calls per day.

13. The computing apparatus of claim 10, wherein the memory is configured to store at least twenty billion records per day.

14. The computing apparatus of claim 10, wherein the processor is further configured to conduct at least fifty million transactions per day.

15. The computing apparatus of claim 10, wherein the memory has an availability of at least 99.99%, such that an unavailability of the memory is less than one hour per year.

16. The computing apparatus of claim 10, wherein the processor is further configured to implement a data reconciliation framework configured to track event count mismatches and to perform a rehydration process to remedy the event count mismatches.

17. The computing apparatus of claim 10, wherein the query part is horizontally scaled by dynamically partitioning the memory so that each partition has a maximum capacity.

18. A non-transitory computer readable storage medium storing instructions for providing rapid accessibility to data, the storage medium comprising executable code which, when executed by a processor, causes the processor to:

receive a first set of data;

store the first set of data in a memory;

receive, from a user, a first query that relates to the first set of data; and provide, to the user in response to the first query, a subset of the first set of data, wherein the memory includes a non-relational database that implements a Command Query Responsibility Segregation (CQRS) architecture within which a command part is configured to perform write operations and a query part is configured to perform read operations, and wherein the query part is horizontally scaled such that the provision of the subset of the first set of data is performable within less than one second of the reception of the first query.

19. The storage medium of claim 18, wherein when the first query is received via an application programming interface (API), the provision of the subset of the first set of data is performable via the API within less than 100 milliseconds of the reception of the first query.

20. The storage medium of claim 18, wherein the query part is horizontally scaled by dynamically partitioning the memory so that each partition has a maximum capacity.

* * * * *